(12) United States Patent
Truco et al.

(10) Patent No.: US 11,952,904 B2
(45) Date of Patent: Apr. 9, 2024

(54) TURBOMACHINE MODULE EQUIPPED WITH AN ELECTRIC MACHINE ROTOR

(71) Applicant: SAFRAN AIRCRAFT ENGINES, Paris (FR)

(72) Inventors: Romain Truco, Moissy-Cramayel (FR); Claire Marie Figeureu, Moissy-Cramayel (FR); Paul Ghislain Albert Levisse, Moissy-Cramayel (FR); Pierre-Alain Jean Philippe Reigner, Moissy-Cramayel (FR); Michel Gilbert Roland Brault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/905,717

(22) PCT Filed: Mar. 4, 2021

(86) PCT No.: PCT/FR2021/050369
§ 371 (c)(1),
(2) Date: Sep. 6, 2022

(87) PCT Pub. No.: WO2021/181031
PCT Pub. Date: Sep. 16, 2021

(65) Prior Publication Data
US 2023/0104669 A1    Apr. 6, 2023

(30) Foreign Application Priority Data
Mar. 10, 2020  (FR) .................................. 2002367

(51) Int. Cl.
*F01D 15/10*    (2006.01)
*F01D 21/04*    (2006.01)
*F02K 3/06*    (2006.01)

(52) U.S. Cl.
CPC .......... *F01D 15/10* (2013.01); *F01D 21/045* (2013.01); *F02K 3/06* (2013.01);
(Continued)

(58) Field of Classification Search
CPC .......... F01D 15/10; F01D 21/045; F02K 3/06; F05D 2220/36; F05D 2220/76; F05D 2260/311
See application file for complete search history.

(56) References Cited

U.S. PATENT DOCUMENTS

| 4,147,945 A |  | 4/1979 | Holz et al. |
| 11,639,669 B2 * | | 5/2023 | Drozd ..................... F01D 21/14 60/39.091 |

(Continued)

FOREIGN PATENT DOCUMENTS

| EP | 1 382 801 A1 | 1/2004 |
| EP | 2 602 434 A2 | 6/2013 |

(Continued)

OTHER PUBLICATIONS

International Search Report dated May 4, 2021, issued in corresponding International Application No. PCT/FR2021/050369, filed Mar. 4, 2021, 6 pages.

(Continued)

*Primary Examiner* — Topaz L. Elliott
(74) *Attorney, Agent, or Firm* — CHRISTENSEN O'CONNOR JOHNSON KINDNESS PLLC

(57) ABSTRACT

A fan module for an aircraft turbomachine includes a fan with a disc carrying fan blades and a rotor of an electric machine. The rotor has an annular shape and is mounted coaxially downstream of the fan. The module further includes an annular support for the rotor with a downstream end fixed to the rotor and with an upstream end fixed to the fan disc. The support is fixed to the disc by shear bolts (Continued)

configured to break when a torque transmitted by the disc to the support exceeds a predetermined threshold.

11 Claims, 6 Drawing Sheets

(52) U.S. Cl.
CPC .... *F05D 2220/323* (2013.01); *F05D 2220/36* (2013.01); *F05D 2220/76* (2013.01); *F05D 2260/311* (2013.01); *F05D 2270/09* (2013.01)

(56) References Cited

U.S. PATENT DOCUMENTS

| | | | |
|---|---|---|---|
| 2004/0070211 A1 | 4/2004 | Franchet et al. | |
| 2005/0121916 A1* | 6/2005 | Olsen | F02C 7/32 290/52 |
| 2006/0110244 A1* | 5/2006 | Brault | F01D 21/045 415/110 |
| 2014/0119893 A1 | 5/2014 | Servant | |
| 2019/0055991 A1* | 2/2019 | Wuestenberg | F02C 3/107 |
| 2020/0018181 A1 | 1/2020 | Brault et al. | |
| 2020/0025024 A1 | 1/2020 | Leynaud et al. | |
| 2021/0010382 A1* | 1/2021 | Davies | F01D 19/00 |
| 2021/0396149 A1* | 12/2021 | Guillotel | F01D 15/10 |
| 2021/0396193 A1* | 12/2021 | Guillotel | F01D 15/10 |
| 2022/0251964 A1* | 8/2022 | Drozd | F01D 21/14 |
| 2022/0403751 A1* | 12/2022 | Millier | F01D 15/10 |
| 2023/0002066 A1* | 1/2023 | Millier | F02K 3/06 |

FOREIGN PATENT DOCUMENTS

| | | |
|---|---|---|
| FR | 2 393 227 A1 | 12/1978 |
| FR | 2 976 623 A1 | 12/2012 |
| FR | 3 081 523 A1 | 11/2019 |
| WO | 2018/115763 A1 | 6/2018 |

OTHER PUBLICATIONS

Written Opinion dated May 4, 2021, issued in corresponding International Application No. PCT/FR2021/050369, filed Mar. 4, 2021, 5 pages.

English translation of Written Opinion dated May 4, 2021, issued in corresponding International Application No. PCT/FR2021/050369, filed Mar. 4, 2021, 4 pages.

International Preliminary Report on Patentability dated Sep. 6, 2022, issued in corresponding International Application No. PCT/FR2021/050369, filed Mar. 4, 2021, 6 pages.

* cited by examiner

TURBOMACHINE MODULE EQUIPPED WITH AN ELECTRIC MACHINE ROTOR

FIELD OF THE DISCLOSURE

The present disclosure relates in particular to an aircraft turbomachine module equipped with a rotor of an electric machine.

BACKGROUND

The prior art comprises in particular the document FR-A1-2 842 565 which describes a turbomachine equipped with an electric machine as well as the documents FR-A1-2 976 623, EP-A1-1 382 802, WO 2018/115763 A1, FR-A1-2 393 227, FR-A1-3 081 523 and EP-A2-2 602 434.

The aeronautic world is now asking many questions about the relevance of using hybrid engines for commercial aviation. The use of electrical energy is now being considered not only for aircraft functions but also for electrifying functions of the turbomachine.

This observation leads to the study of hybrid engine architecture solutions, combining fossil fuel energy and electrical energy to ensure the driving of the propulsive portion (turbomachine fan) and the feed of certain engine and/or aircraft functions.

These architectures can in particular be based on a high bypass ratio and reducer type architecture, but also on a multiple body architecture (2 or 3). In these architectures, the turbomachine comprises a low-pressure body and a high-pressure body, each body comprising a shaft connecting a rotor of a compressor to a rotor of a turbine.

It is known to equip an aircraft turbomachine with an electric machine. It is recalled that an electric machine is an electromechanical device based on electromagnetism that allows the conversion of electrical energy into work or mechanical energy, for example. This process is reversible and can be used to generate electricity.

Thus, depending on the end use of a machine, the terms:
generator to designate an electric machine producing electrical energy from mechanical energy,
motor for an electric machine producing mechanical energy from electrical energy.

An electric machine can also behave in motor mode as well as in generator mode.

In nominal operation, two types of forces are applied to the rotor of an electric machine: a torque (resistive or motor, depending on the operating conditions), and a radial force.

The rotor of the electric machine is attached to a disc of the fan by means of a flange and screws. This allows the disc to rotate the rotor of the electric machine. This attachment also allows to ensure that the rotor of the electric machine is held securely. The screws are loaded in tension and ensure that the connection is maintained by friction between the two faces of the flange in order to take up the radial force and the torque of the electric machine. The screws are then sized by the implantation radius of the flange and the coefficient of friction at the level of the flange.

In the event of an extreme event, e.g. a vane loss of the fan disc, the disc becomes severely unbalanced and begins to orbit due to a large amount of unbalance. This imbalance can cause an eccentricity which in turn causes the air-gap of the electric machine to close. Since the eccentricity due to the vane loss is much greater than the rotor-stator clearance of the electric machine, there is rotor-stator contact of the electric machine.

This rotor-stator contact of the electric machine slightly increases the magnetic radial force, but above all causes a significant purely mechanical force: a portion of the unbalance force passes through the electric machine by means of the flange and the screws, generating a radial force through the flange, but also a friction torque at the level of the electric machine between the rotor and the stator. If continued, this friction at the level of the electric machine, and in particular the contact between the magnets of the electric rotor and the magnetic steel sheets of the stator, can lead to a motor fire and/or potentially a blockage of the fan disc.

The present disclosure proposes a solution to at least some of the above problems.

SUMMARY

The present disclosure proposes a fan module for an aircraft turbomachine, comprising:
a fan comprising a disc carrying fan vanes,
a rotor of an electric machine, the rotor being generally annular in shape and mounted coaxially downstream of the fan,
an annular support for the rotor, a downstream end of which is attached to the rotor and an upstream end of which is attached to the fan disc.

According to the disclosure, the support is attached to the disc by means of fusible screws which are configured to break when a torsional torque transmitted from the disc to the support exceeds a predetermined threshold.

With the disclosure, in the event of a major incident such as a vane breakage, the imbalance of the fan disc and the resulting eccentricity will cause the fusible screws to break. The electric rotor will therefore no longer be rotated by the fan disc and will become a stator part attached due to the magnetising force between it and its stator. By decoupling the electric machine rotor from the fan disc, the disclosure thus allows to avoid, in particular, the risk of fire linked to the rotor-stator contact of the moving electric machine and, in particular, the blocking of the fan disc.

The cross-section of the fusible screws is designed to ensure the resistance in nominal operation and to break at a certain force caused by the rotor-stator contact on the electric machine. For example, assuming that a quarter of the radial force is transmitted through the electric machine, the fusible screws can be sized to break in the event of vane breakage while still ensuring the resistance on the limit and design cases of operation.

The system according to the disclosure may comprise one or more of the following characteristics, taken alone or in combination with each other:
the support comprises a downstream cylindrical segment for mounting the rotor and a first upstream annular flange for attaching to the disc, the flange comprising orifices for the passage of the fusible screws;
the downstream segment is connected to the first flange by a frustoconical wall flared downstream;
the downstream segment comprises an upstream annular stop on which the rotor is intended to bear, and a downstream thread for attaching a nut which is configured to bear on the rotor to keep it tightened axially against this stop;
the downstream segment comprises a radially internal annular rim for retaining the fusible screws after breakage;
the rim comprises through orifices for the passage of oil;
the fan comprises inter-vane platforms which are attached to the disc, the module further comprising an annular ferrule for retaining the downstream ends of these platforms, this ferrule comprising an external periphery which surrounds and retains the downstream ends of the platforms and an internal periphery which comprises a second annular flange for attachment to the disc, this second flange comprising orifices for the passage of attaching screws;

the disc comprises at its external periphery a series of teeth which define between them alveoli for mounting the roots of the vanes, each of these teeth comprising at its downstream end an ear for attaching the ferrule, orifices for the passage of the attaching screws being formed in these ears;

the second flange is interposed between the disc and the first flange, the fusible screws passing through the orifices in the first flange as well as orifices in the second flange, and the attaching screws passing through the orifices in the second flange without passing through orifices in the first flange;

the fusible screws are located on a first circumference and the attaching screws are located on a second circumference, the first circumference having an internal diameter smaller than the diameter of the second circumference.

The disclosure also relates to an aircraft turbomachine, comprising a module as described above, this turbomachine comprising a stator of the electric machine, this stator surrounding the rotor of this electric machine of the module.

DESCRIPTION OF THE DRAWINGS

Further characteristics and advantages of the disclosure will become apparent from the following detailed description, for the understanding of which reference is made to the annexed drawings in which.

DETAILED DESCRIPTION

Figure 1:
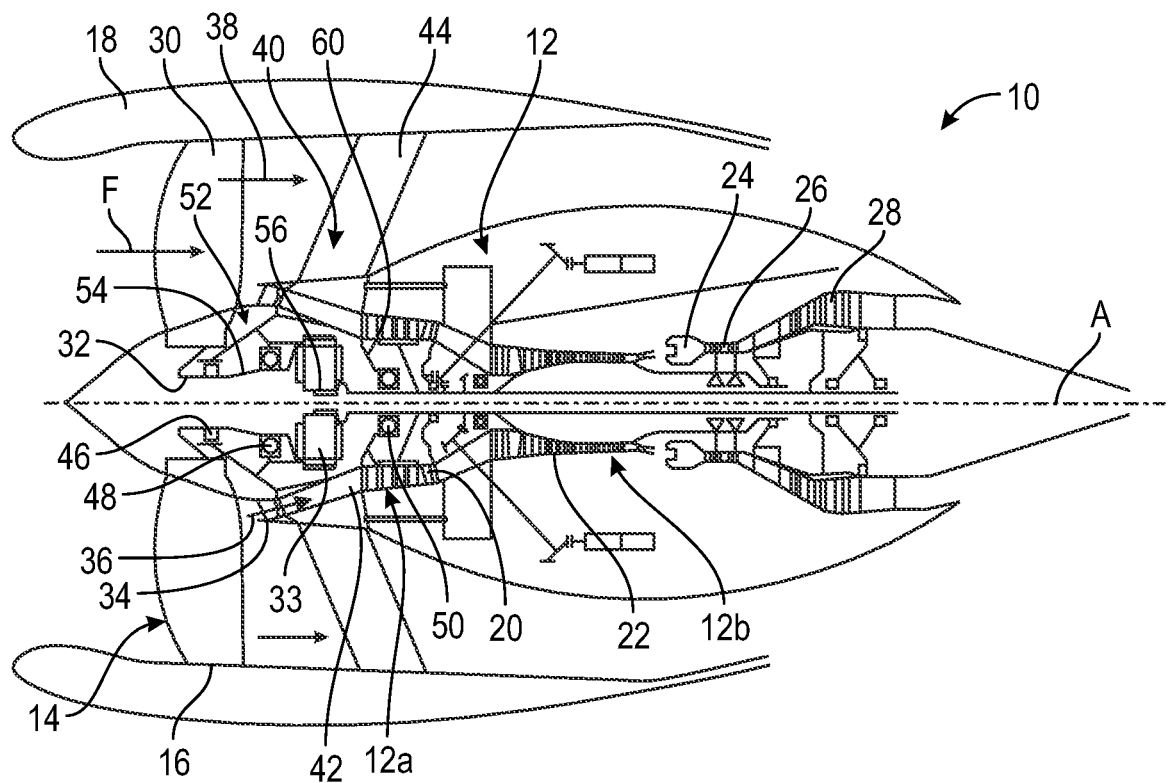
FIG. 1 is a schematic axial cross-sectional view of an aircraft turbomachine.

Reference is first made to FIG. 1, which shows schematically a double-body and double-flow aircraft turbomachine 10.

The turbomachine 10 typically comprises a gas generator 12 with a fan 14 upstream. The fan 14 is surrounded by a fan casing 16 which is surrounded by a nacelle 18 which extends around and along a major part of the gas generator 12.

The gas generator 12 comprises two bodies, namely a low-pressure body 12a or LP and a high-pressure body 12b or HP. Each body comprises a compressor and a turbine.

The terms "upstream" and "downstream" are considered along a main direction F of flow of the gases in the turbomachine 10, this direction F being parallel to the longitudinal axis A of the turbomachine.

Also, by convention in the present application, the terms "internal" and "external" are defined radially with respect to the longitudinal axis of the turbomachine, which is in particular the axis of rotation of the rotors of the compressors.

From upstream to downstream, the gas generator 12 comprises a low-pressure compressor 20, a high-pressure compressor 22, a combustion chamber 24, a high-pressure turbine 26 and a low-pressure turbine 28.

The fan 14 comprises an annular row of vanes 30 driven in rotation by a fan shaft 32 which is connected to the rotor of the low-pressure body 12a in particular by means of a reducer 33. However, in an alternative embodiment of the disclosure not shown, the turbomachine may not comprise a reducer.

The gas flow which passes through the fan (arrow F) is split upstream of the gas generator 12 by an annular splitter nose 34 into a radially internal annular flow, referred to as the primary flow 36 which feeds the gas generator 12, and a radially external annular flow, referred to as the secondary flow 38 which flows between the gas generator 12 and the nacelle 18 and provides most of the thrust of the turbomachine.

An inlet casing 40 structurally connects the gas generator 12 to the fan casing 16 and the nacelle 18. The inlet casing 40 comprises an annular row of radially internal arms 42 extending into the primary flow 36, and an annular row of radially external straighteners 44 (of the OGV type for outlet guide vanes) extending into the secondary flow 38. The arms 42 are generally limited in number (less than ten) and may be tubular and passed through by auxiliaries. The number of vanes 44 (OGV) is usually greater than ten.

The rotor of the low-pressure body 12a and the fan shaft 32 are guided upstream by bearings 46, 48 and 50. These bearings 46, 48, 50 are of the ball or roller type and each comprise an internal ring mounted on the shaft to be guided, an external ring carried by an annular bearing support and a rolling between the rings.

In a known manner, the reducer 33 is of the epicyclic gear train type and comprises a sun gear centred on the axis A, a ring gear extending around the axis and planet gears which mesh with the sun gear and the ring gear and are carried by a planet carrier. The ring gear is stationary and firmly connected to a support of the bearings 46, 48. The planet carrier is rotatable and connected to an output shaft 54 of the reducer, which also comprises an input shaft 56 meshed with the sun gear. The input shaft 56 of the reducer is coupled to the main shaft of the low-pressure body, and the output shaft 54 is coupled to the fan shaft 32.

The input shaft of the reducer is guided by the bearing 50 which is carried by a bearing support 60. The output shaft 54 is guided by the bearings 46, 48.

The bearing supports 52, 60 extend around the axis A and are stationary parts connected to the inlet casing 40.

Figure 2:
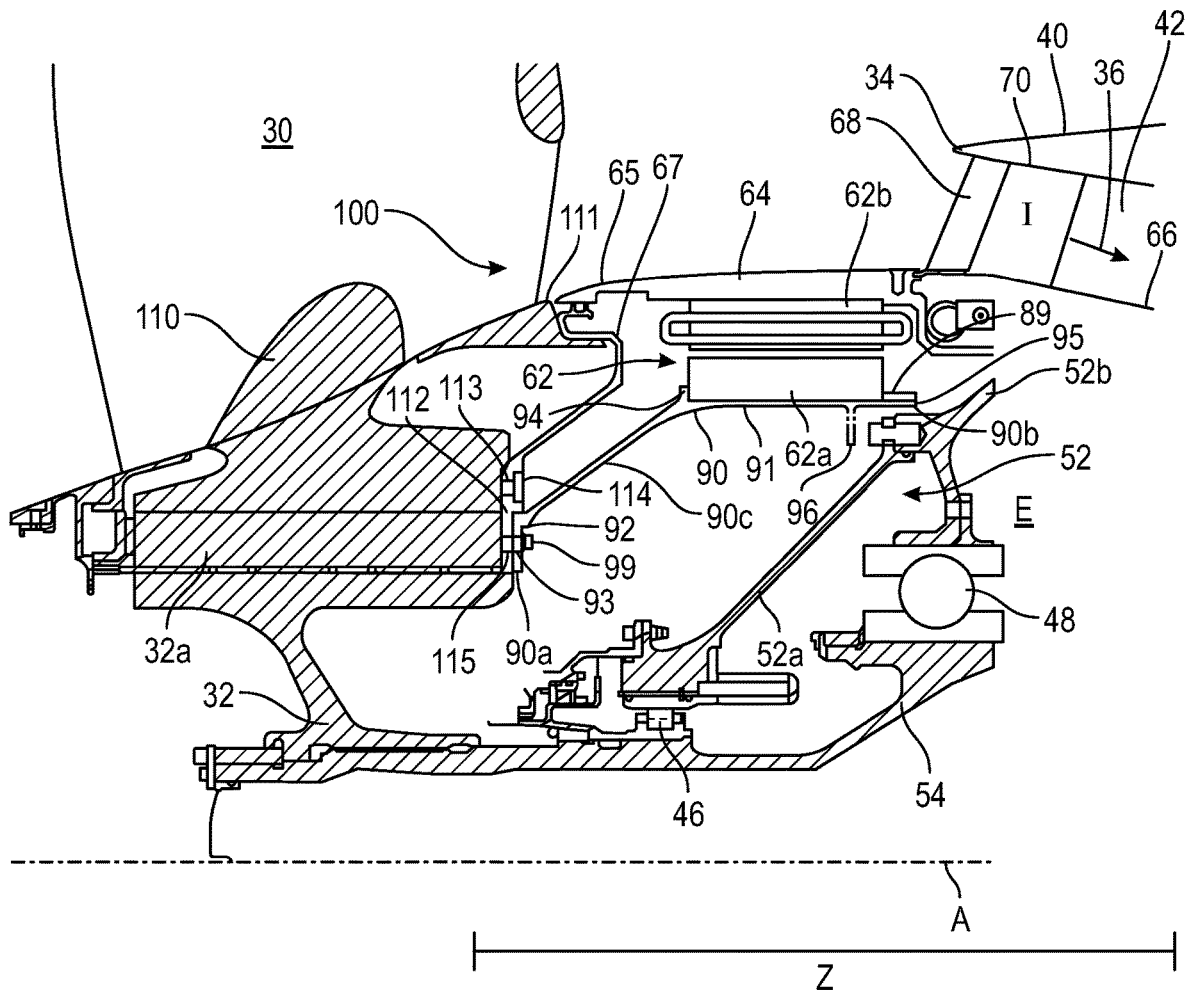
FIG. 2 is a partial schematic half-view in axial cross-section of an aircraft turbomachine equipped with an electric machine.

FIG. 2 is a larger scale view of a portion of FIG. 1, and in particular the area Z located between the fan disc 32a and the reducer (not shown in FIG. 2), in which an electric machine 62 is installed. It allows to illustrate a module 100 according to the disclosure comprising the fan and a rotor 62a of the electric machine 62.

In addition to being delimited axially, upstream, by the fan disc 32*a*, and downstream, by the reducer, this annular area Z is delimited radially inwardly by the output shaft 54 of the reducer and radially outwardly by the elements which internally delimit the flow duct I of the primary flow 36. These elements comprise an upstream annular ferrule 64 and a downstream internal annular wall 66 which forms part of the inlet casing 40 as it is connected to the radially internal ends of the arms 42.

The wall 66 extends as an extension of the ferrule 64 which is an internal ferrule, and which is connected by an annular row of stationary vanes 68 to an external ferrule 70. The ferrules 64, 70 define between them the air inlet of the flow duct I of the primary flow 36. The ferrule 70 extends between the aforementioned splitter nose 34 and an external annular wall located downstream of the ferrule 70 and which forms part of the inlet casing 40 as it is connected to the radially external ends of the arms 42.

The annular area Z is divided into two annular segments, upstream and downstream respectively, by the bearing support 52. In the example shown, this support has a generally frustoconical shape that flares downstream. Its upstream and radially internal end carries the external ring of the bearing 46, the internal ring of which is attached to the output shaft 54. The downstream and radially external end of the support 52 is attached to the inlet casing 40.

The external ring of the or each bearing 48 is attached to the support 52, substantially in the middle, with the or each internal ring attached to the output shaft 54. For this purpose, the bearing support 52 comprises two annular stretches, respectively upstream 52*a* and downstream 52*b*. The upstream stretch 52*a* extends from the bearing 46 to a radially external annular flange for attaching to the downstream stretch 52*b*, and the downstream stretch 52*b* extends from a radially internal annular flange for attaching to the upstream stretch 52*a* to a radially external annular flange for attaching to the inlet casing 40.

The or each external ring of the bearing 48 is attached to the downstream stretch 52*b*.

The downstream segment of the area Z represents a portion of an enclosure E for lubrication of the bearings 46, 48 (and 50—FIG. 1) and of the reducer which is housed in this enclosure, being arranged axially between the bearings 46, 48 on the one hand, and the bearing 50 on the other. An oil fog reigns in this enclosure.

The upstream segment of the area Z represents the installation location of the electric machine 62, which is therefore isolated from the enclosure E by the bearing support 52.

The machine 62 is generally annular in shape and comprises the rotor 62*a* and a stator 62*b*. The rotor 62*a* has a generally annular shape extending about the axis A and is mounted coaxially downstream of the fan 14. The rotor 62*a* could also be mounted upstream of the fan 14 but has a larger implementation radius downstream of the fan 14.

The rotor 62*a* is carried by an annular support 90 which is generally cylindrical in shape. The rotor 62*a* is arranged around this annular support 90.

A downstream end 90*b* of the annular support 90 is attached to the rotor 62*a* and an upstream end 90*a* of this support is attached to the fan disc 32*a*.

The support 90 thus allows the fan disc 32*a* to rotate the rotor 62*a*. The stator 62*b* also has a generally cylindrical shape and is integrated in contact with the ferrule 64.

The ferrule 64 cooperates in a sealing manner with the bearing support 52 (cooperation not shown). The sealing is provided by a labyrinth seal, the annular wipers of which are carried by the ferrule 64, for example, and the abradable coating is carried by the bearing support 52.

The stator 62*b*, for example, is connected by an electrical cable to a control circuit, in this case passing through the tubular arm 42 of the inlet casing 40.

The electric machine 62 and in particular its stator 62*b* is located as close as possible to the main flow after passing through the fan 14 and/or the primary flow 36, i.e. as close as possible to the ferrule 64.

The ferrule 64 also retains downstream ends 111 of inter-vane platforms 110 which are attached to the disc 32*a*. This ferrule 64 comprises an external periphery 65 which surrounds and retains the downstream ends 111 of the platforms 110 and an internal periphery 67 which comprises a second annular flange 112 for attaching to the disc 32*a* located at the level of an internal end of the second flange 112. The second flange 112 comprises orifices 113 for the passage of attaching screws 114.

According to the disclosure, the support 90 is attached to the disc 32*a* by means of fusible screws 99 which are configured to break when a torsional torque transmitted from the disc 32*a* to the support 90 exceeds a predetermined threshold.

The support 90 comprises a cylindrical downstream segment 91 for mounting the rotor 62*a* and a first upstream annular flange 92 for attaching to the disc 32*a*, this flange 92 comprising orifices 93 for the passage of the fusible screws 99.

The downstream segment 91 is connected to the first flange 92 by a frustoconical wall 90*c* flaring downstream.

Figure 3:
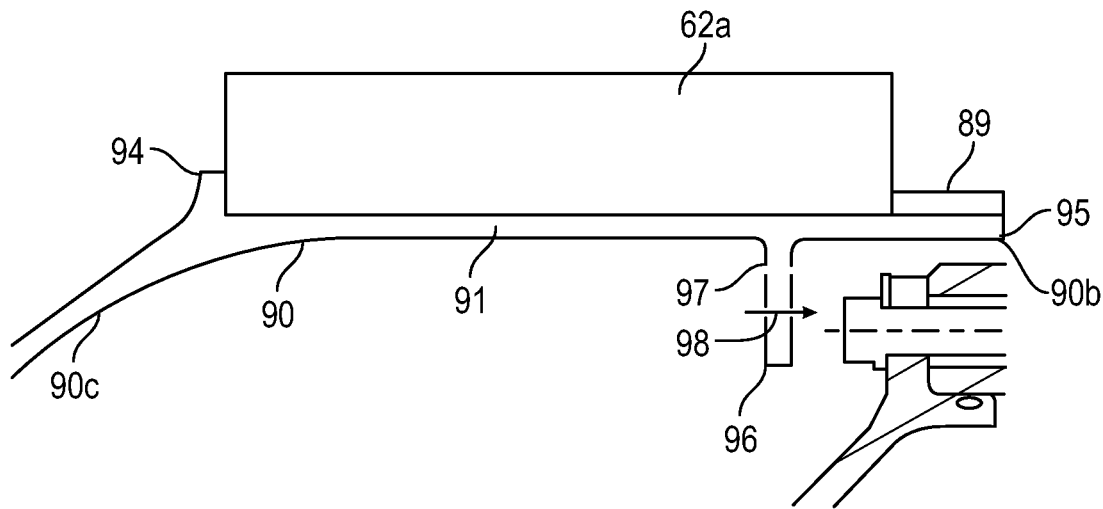
FIG. 3 is a schematic axial cross-sectional view of an electric machine rotor and its support.

As best seen in FIG. 3, the downstream segment 91 comprises an upstream annular stop 94 on which the rotor 62*a* is intended to bear, and a downstream thread 95 for attaching a nut 89 which is configured to bear on the rotor 62*a* to hold it axially tightened against this stop 94.

The downstream segment 91 comprises a radially internal annular rim 96 for retaining the fusible screws 99 after breaking. Indeed, in a situation where the rotor 62*a* is decoupled from the fan disc, the rotor 62*a* becomes a stator, and the broken fusible screws 99 then accumulate on an internal face of the downstream segment 91 and are retained by the annular rim 96.

This annular rim 96 allows the rotor 62*a* to be balanced. The balancing of the rotor 62*a* can in fact be realized by locally machining the annular rim 96 according to an observed unbalance, in order to correct the latter. This annular rim 96 also contributes to the stiffness of the downstream segment 91 and thus to a maintenance of the air-gap clearance between the rotor 62*a* and the stator 62*b* of the electric machine 62.

The annular rim 96 comprises through orifices 97 of oil passage allowing the release of the oil in the direction of the arrow 98 in the event of an oil leak in this area.

Figure 4:
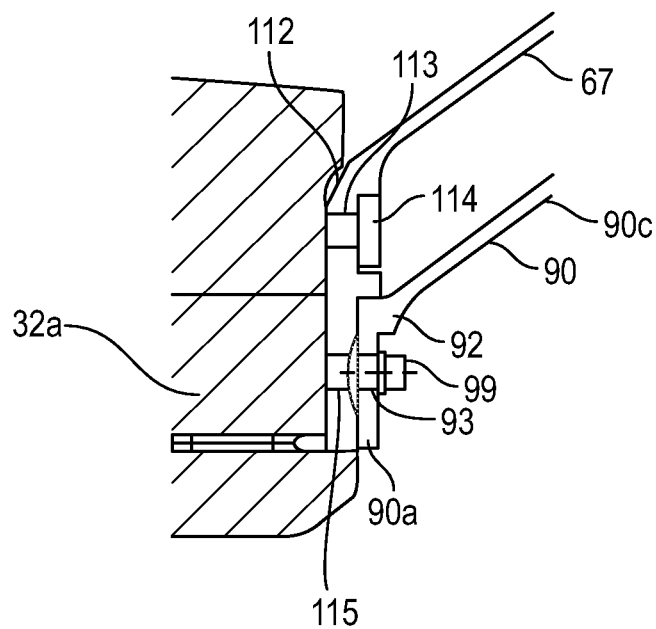
FIG. 4 is a partial schematic view in axial cross-section of attaching flanges of a ferrule and the rotor of the electric machine to a fan disc of the turbomachine.

As shown in FIG. 4, the second flange 112 is interposed between the disc 32*a* and the first flange 92. The fusible screws 99 pass through the orifices 93 in the first flange 92 and orifices 115 in the second flange 112. The attaching screws 114 pass through the orifices 113 in the second flange 112 without passing through any orifices in the first flange 92.

The fusible screws 99 are located on a first circumference and the attaching screws 114 are located on a second circumference, the first circumference having a smaller internal diameter than the second circumference. The second flange 112 is thus separated from the rotor of the electric machine to allow the latter to decouple without releasing the fan disc from the second flange 112.

Figure 5:
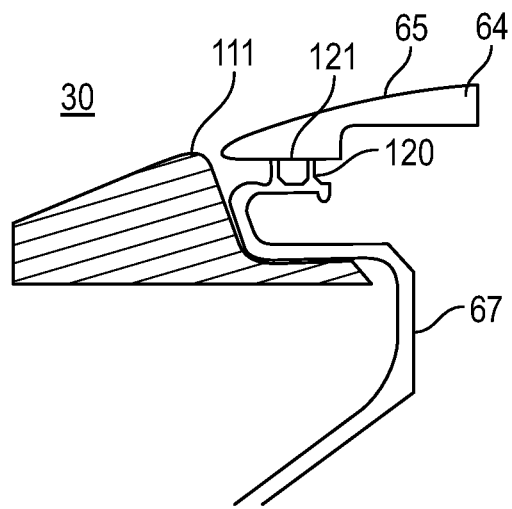
FIG. 5 is a partial schematic view of the connection between a fan vane root and a fan ferrule in axial cross-section.

As illustrated in FIG. 5, the external end of the internal periphery 67 comprises annular wipers 120 for cooperating with an abradable coating 121 of the external periphery 65 of the ferrule 64. The wipers 120 and the coating 121 form a labyrinth type seal.

Figure 6:
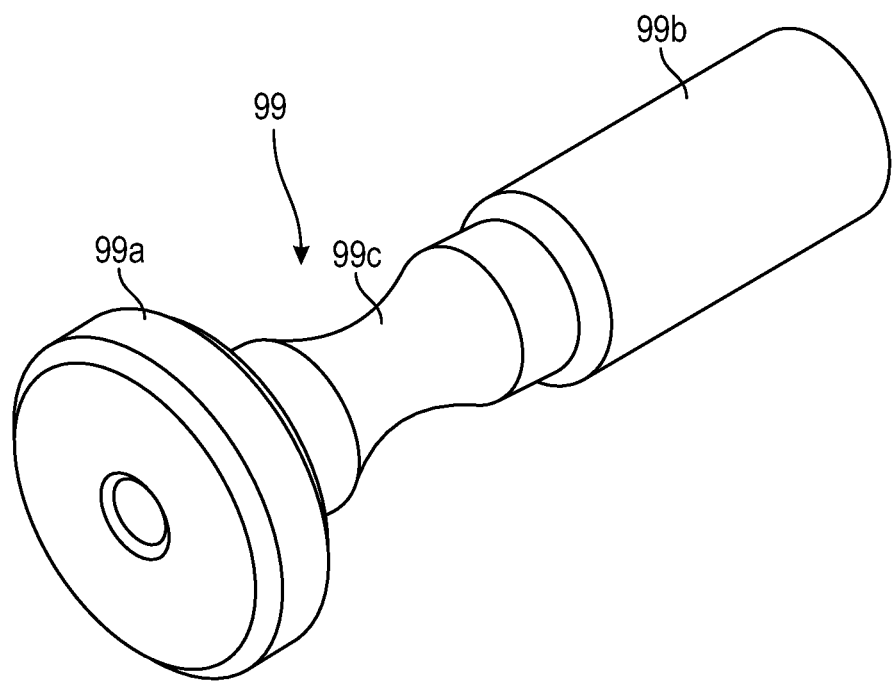
FIG. 6 is a schematic axial cross-sectional view of a fusible screw according to the disclosure.

FIG. 6 shows an example of a fusible screw 99 according to the disclosure. Such a screw 99 comprises a screw head 99a and a thread 99b. The fusible character of the screw 99 is shown by its intermediate segment 99c of reduced section, arranged between the head 99a and the thread 99b so as to serve as a breaker, in particular in shearing.

Figure 7:
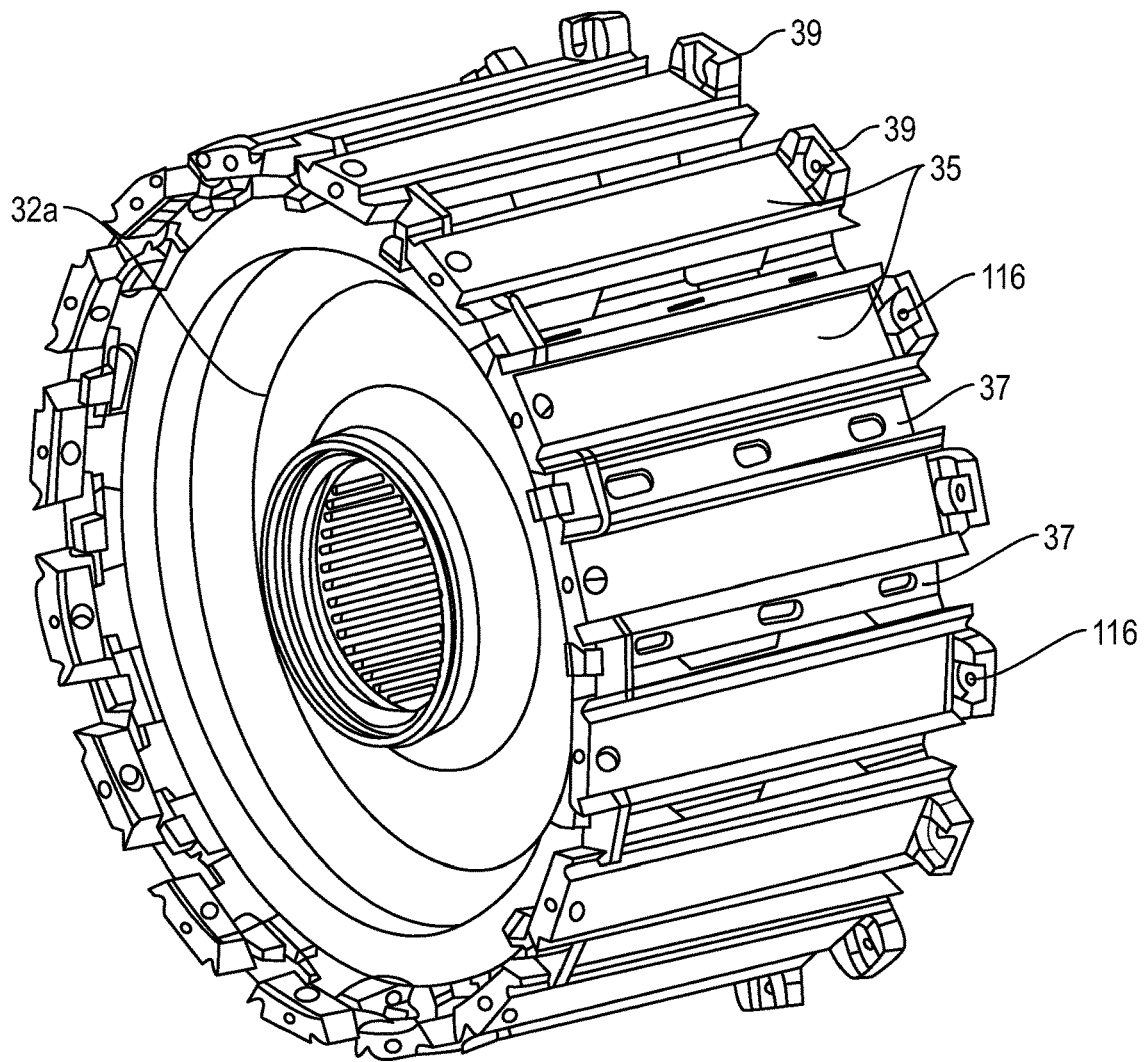
FIG. 7 is a schematic perspective view of the fan disc.
Figure 8:
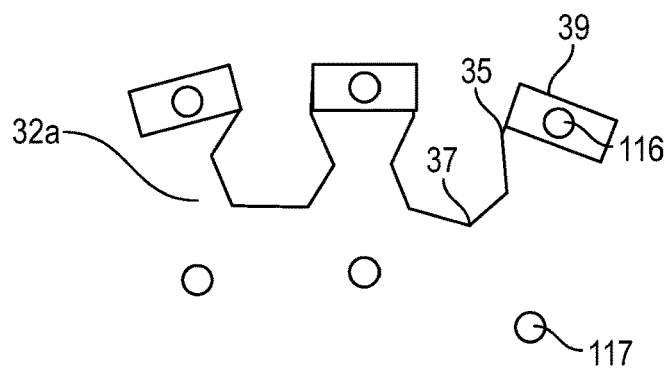
FIG. 8 is a partial schematic radial cross-sectional view of the fan disc of FIG. 7.

The tightening of the screw is realized here with a hexagonal key. Other clamping modes can also be adopted. As can be seen in FIGS. 7 and 8, the disc 32a comprises at its external periphery a series of teeth 35 which define between them alveoli 37 for mounting roots of the vanes, each of these teeth 35 comprising at its downstream end an ear 39 for attaching the ferrule.

Orifices 116 for the passage of the attaching screws are formed in these ears 39 and are intended to be located opposite the orifices 113 for the passage of the screws for attaching the second flange 112. Orifices 117 for the passage of the fusible screws are formed in the disc 32a, located radially inwardly with respect to the orifices 116 and are intended to face the orifices 93 for the passage of the fusible screws in the first flange 92 and the orifices 115 in the second flange 112.

Figure 9:
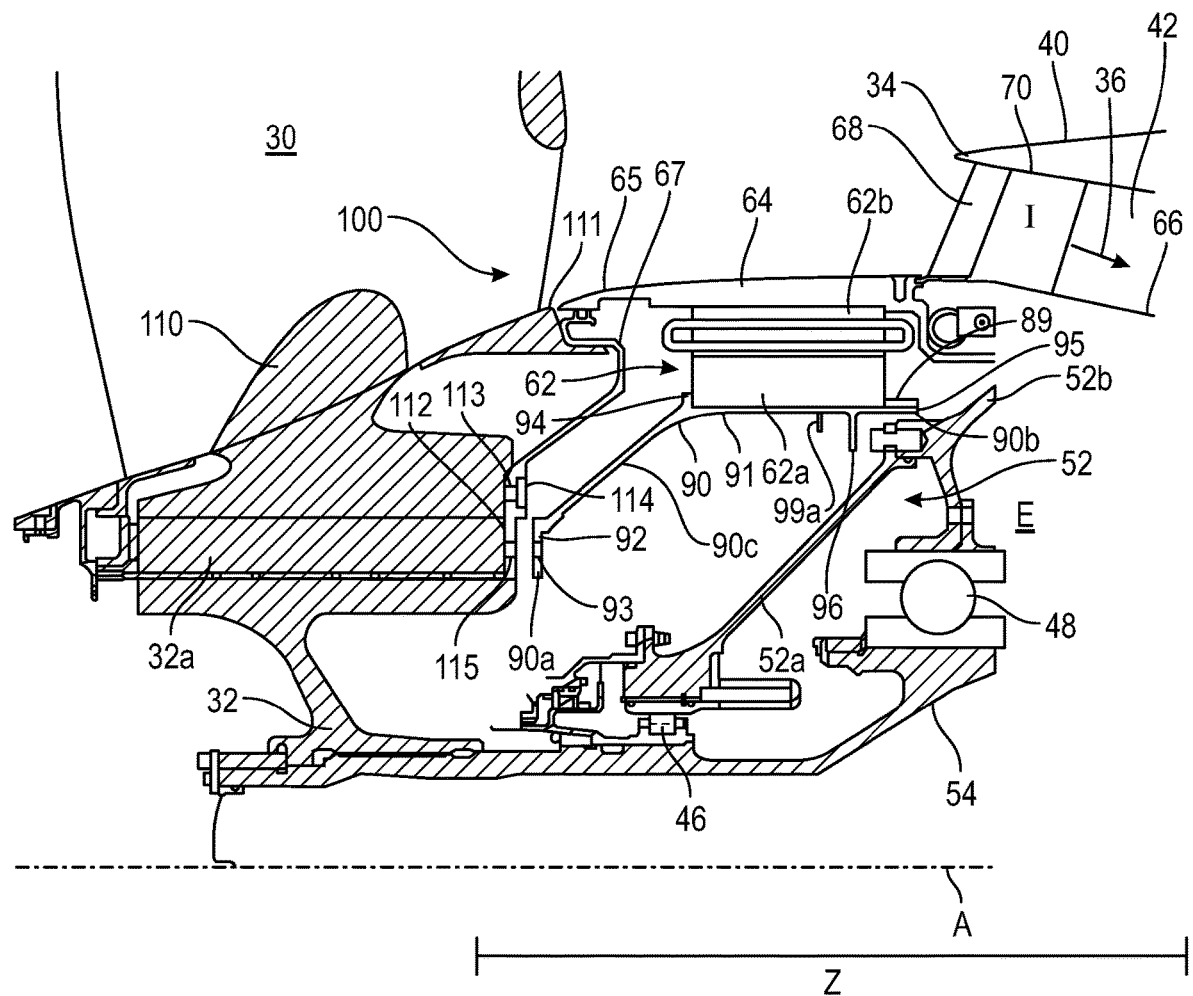
FIG. 9 is a schematic axial cross-sectional view similar to FIG. 2 in which the fusible screws are broken.

FIG. 9 is similar to FIG. 2 and illustrates an example where the fusible screws 99 have failed, for example as a result of a loss of vane, thereby releasing the rotor 62a from the fan disc 32a. Indeed, such a loss of vane will create a significant unbalance on the fan disc 32a which will in turn cause a radial force of the fan disc 32a on the first flange 92. The fusible screws are then sized to fail in shearing under the effect of the frictional torque of the rotor on the stator of the electric machine transmitted by the disc 32a and the radial force of the fan disc on the first flange 92.

It can be seen here that the rotor 62a is in contact with the stator 62b and has itself become a stator. The debris 99a from the broken fusible screws may then accumulate against an internal face of the downstream segment 91 of the support 90 and in particular against the annular rim 96.

FIG. 9 also allows to illustrate that the fan disc 32a remains connected to the internal periphery 67 of the ferrule 64 by means of the second flange 122.

The invention claimed is:

1. A fan module for an aircraft turbomachine, comprising:
a fan comprising a disc carrying fan vanes,
a rotor of an electric machine the rotor being annular in shape and being mounted coaxially downstream of the fan,
an annular support for the rotor, a downstream end of which is attached to said rotor and an upstream end of which is attached to the disc,
wherein the support is attached to the disc by means of fusible screws configured to break when a torsional torque transmitted from the disc to the support exceeds a predetermined threshold.

2. The module according to claim 1, wherein the support comprises a downstream cylindrical segment configured to mount said rotor and a first upstream annular flange configured to attach said disc, the first flange comprising orifices being configured for the passage of said fusible screws.

3. The module according to claim 2, wherein the downstream segment is connected to the first flange by a frusto-conical wall flared downstream.

4. The module according to claim 2, wherein the downstream segment comprises an upstream annular stop on which said rotor is configured to bear, and a downstream thread for attaching a nut which is configured to bear on the rotor to keep the rotor tightened axially against the stop.

5. The module according to claim 2, wherein the downstream segment comprises a radially internal annular rim configured to retain the fusible screws after breakage.

6. The module according to claim 5, wherein said rim comprises through orifices for oil passage.

7. The module according to claim 2, wherein the fan comprises inter-vane platforms which are attached to the disc, the module further comprising an annular ferrule configured to retain downstream ends of the platforms, the ferrule comprising an external periphery which surrounds and retains the downstream ends of the platforms and an internal periphery which comprises a second annular flange configured to attach to the disc, the second flange comprising orifices configured for the passage of attaching screws.

8. The module according to claim 7, wherein the disc comprises at an external periphery a series of teeth which define between them alveoli configured to mount roots of said vanes, each of the teeth comprising at a downstream end an ear configured to attach said ferrule, orifices configured for the passage of the attaching screws being formed in the ears.

9. The module according to claim 7, wherein said second flange is interposed between the disc and said first flange, said fusible screws passing through the orifices in the first flange as well as the orifices in the second flange, and said attaching screws passing through the orifices in the second flange without passing through orifices in the first flange.

10. The module according to claim 9, wherein said fusible screws are located on a first circumference and said attaching screws are located on a second circumference, the first circumference having an internal diameter smaller than the diameter of the second circumference.

11. An aircraft turbomachine, comprising a module according to claim 1, the electric machine comprising a stator surrounding the rotor of the electric machine.

* * * * *